(12) United States Patent
Seitz et al.

(10) Patent No.: US 11,573,080 B2
(45) Date of Patent: Feb. 7, 2023

(54) ULTRASONIC MEASURING UNIT

(71) Applicants: M & H Inprocess Messtechnik GmbH, Waldburg (DE); Karl Deutsch Prüf—und Messgerätebau GmbH + Co KG, Wuppertal (DE)

(72) Inventors: Matthias Seitz, Berg (DE); Simon Steves, Bochum (DE)

(73) Assignees: M & H Inprocess Messtechnik GmbH, Waldburg (DE); Karl Deutsch Prüf—und Messgerätebau GmbH + Co KG, Wuppertal (DE)

( * ) Notice: Subject to any disclaimer, the term of this patent is extended or adjusted under 35 U.S.C. 154(b) by 0 days.

(21) Appl. No.: 17/652,148

(22) Filed: Feb. 23, 2022

(65) Prior Publication Data

US 2022/0178685 A1    Jun. 9, 2022

Related U.S. Application Data (63) Continuation of application No. PCT/EP2020/074230, filed on Aug. 31, 2020.

(30) Foreign Application Priority Data

Aug. 29, 2019    (DE) .................. 10 2019 123 145.0

(51) Int. Cl.
*G01B 17/02* (2006.01)
(52) U.S. Cl.
CPC ................... *G01B 17/02* (2013.01)
(58) Field of Classification Search
CPC .... G01B 17/02; G01N 29/221; G01N 29/225; G01N 29/2462; G01N 29/265; G01N 29/28
See application file for complete search history.

(56) References Cited

U.S. PATENT DOCUMENTS

| 3,921,442 A | 11/1975 | Soloway |
| 2015/0272544 A1 | 10/2015 | Raum et al. |
| 2017/0284971 A1* | 10/2017 | Hall ............ G01B 21/04 |

FOREIGN PATENT DOCUMENTS

| CN | 106643591 A * | 5/2017 |
| EP | 3 201 566 B1 | 9/2018 |

(Continued)

OTHER PUBLICATIONS

German Search Report (Application No. 10 2019 123 145.0) dated Jun. 16, 2020.

(Continued)

*Primary Examiner* — Tarun Sinha
(74) *Attorney, Agent, or Firm* — Burr & Brown, PLLC (57) ABSTRACT

The invention relates to an ultrasonic measuring unit for attaching to a measuring instrument. The measuring instrument is designed in such a way that the measuring instrument can be arranged on a movement axis of a machine. When the ultrasonic measuring unit is arranged on the measuring instrument, an ultrasonic measurement can be carried out by means of the ultrasonic measuring unit. The ultrasonic measuring unit comprises a tubular sleeve and an elastic carrier element. The tubular sleeve surrounds the elastic carrier element. The elastic carrier element consists of a material that conducts ultrasonic waves. At a first end of the tubular sleeve, the elastic carrier element protrudes beyond an outer edge of the tubular sleeve. The tubular sleeve and the elastic carrier element are intended to contact, in particular directly, the surface to be measured, during a probing process of the measuring instrument.

19 Claims, 3 Drawing Sheets

(56) References Cited

FOREIGN PATENT DOCUMENTS

| | | | |
|---|---|---|---|
| FR | 2914095 A1 * | 9/2008 | ............... B65C 9/42 |
| JP | H06-011329 A | 1/1994 | |
| JP | H09-318342 A | 12/1997 | |
| JP | 2003-000592 A | 1/2003 | |
| JP | 2012-002586 A | 1/2012 | |

OTHER PUBLICATIONS

International Search Report and Written Opinion (Chapter I) (Application No. PCT/EP2020/074230) dated Dec. 8, 2020 (with English translation).

International Preliminary Report on Patentability (Chapter II) (Application No. PCT/EP2020/074230) dated Jul. 27, 2021 (with English translation).

Japanese Office Action (with English translation) dated Sep. 27, 2022 (Application No. 2022-513996).

* cited by examiner

ULTRASONIC MEASURING UNIT

CROSS REFERENCE TO RELATED APPLICATIONS

This application is a continuation of International Application No. PCT/EP2020/074230 filed Aug. 31, 2020, which designated the United States, and claims the benefit under 35 USC § 119(a)-(d) of German Application No. 10 2019 123 145.0 filed Aug. 29, 2019, the entireties of which are incorporated herein by reference.

FIELD OF THE INVENTION

The present application relates to an ultrasonic measuring unit.

BACKGROUND OF THE INVENTION

Measuring devices having an ultrasonic measuring head are known.

A known measuring device comprises a robotic arm on which an ultrasonic measuring head is mounted. The ultrasonic measuring head can be moved to defined positions by means of the robotic arm in order to carry out a measurement by means of the ultrasonic measuring head at the defined position.

A disadvantage of the known measuring device is that a position to be measured initially needs to be defined. That is to say, that the workpiece to be measured initially has to be surveyed with a further measuring mechanism so that the robotic arm can move the ultrasonic measuring head to the position to be surveyed, in such a way that an ultrasonic measurement can be carried out. Measurements with the measuring device are, therefore, on the one hand relatively time-intensive, and on the other hand also relatively unreliable and cost-intensive since the ultrasonic measuring head is possibly moved too far away from or too close to the surface to be measured.

SUMMARY OF THE INVENTION

It is an object of the present invention to provide an improved ultrasonic measuring unit, in particular, to provide an improved ultrasonic measuring unit by means of which an, in particular, automatic ultrasonic measurement may be carried out relatively rapidly, reliably and/or precisely.

The present invention is based on an ultrasonic measuring unit to be fitted on a measuring instrument.

The core of the present invention is that the measuring instrument is configured so that it can be arranged on a movement axle of a machine, wherein an ultrasonic measurement can be carried out by means of the ultrasonic measuring unit in the arranged state of the ultrasonic measuring unit on the measuring instrument, wherein the ultrasonic measuring unit comprises a tubular sleeve and a resilient support element, wherein the tubular sleeve encloses the resilient support element, wherein the resilient support element consists of a material that conducts ultrasound waves, wherein the resilient support element protrudes beyond an outer edge of the tubular sleeve at a first end of the tubular sleeve, wherein the tubular sleeve and the resilient support element are intended to contact, in particular directly, the surface to be measured during a sampling process of the measuring instrument. In this way, an ultrasonic measurement may be carried out with a relatively precise repetition accuracy.

The measuring instrument is configured, for example, in the form of a measuring sampler, a separation measuring apparatus and/or a distance measuring apparatus. The measuring instrument is configured, for example, as a measuring sampler, for example, as a touch-probe measuring sampler. It is also conceivable for the measuring instrument to be configured as an optically operating measuring instrument.

The machine is advantageously configured as a machine tool or as a measuring machine. The machine is present, for example, as a CNC processing center. For example, the machine tool is configured as a turning and/or milling center. Advantageously, the machine tool comprises a plurality of machine axles which are movable relative to one another. For example, the machine tool is configured as a 3-axle or as a 5-axle machine tool. For example, the measuring machine is configured as a coordinate measuring machine.

Advantageously, the resilient support element is configured as an elastomer. Preferably, the resilient support element is an ultrasound-wave coupling mechanism. For example, the resilient support element is formed from the known elastomer "Aqualene" or the known elastomer "ACE" from "Innovation Polymers", Canada. Preferably, the resilient support element forms a so-called ultrasound stand-off, a retardation path or a delay line of the ultrasonic measuring unit. Advantageously, the tubular sleeve is formed from a different material than the resilient support element.

In particular because of the use of the resilient support element, the ultrasonic measuring unit, in particular, the measuring instrument, is configured not to require a sound-coupling fluid for the ultrasound measurement between the surface to be measured of a measurement object and the ultrasonic measuring unit, in particular, the resilient support element. The proposed ultrasonic measuring unit does not, for example, require any ultrasound coupling gel. Advantageously, a surface to be measured is contacted immediately and directly with the resilient support element and/or with the tubular sleeve during a measurement. For example, a surface to be measured is contacted immediately and directly by the resilient support element and/or by the tubular sleeve during a measurement.

Advantageously, the tubular sleeve is configured in the form of a hollow cylinder. For example, the tubular sleeve is a hollow cylinder. Advantageously, an outer end side of the hollow-cylindrical tubular sleeve forms the outer edge. For example, the outer edge is configured annularly.

It is furthermore proposed for the tubular sleeve to be formed from a plastic material. For example, the tubular sleeve is formed from a hard plastic. In this way, interfering reflections of ultrasound waves are avoided. Advantageously, the tubular sleeve is formed from an ultrasound-attenuating material. For example, the tubular sleeve is formed from a material which attenuates sound waves in the ultrasound range relatively strongly.

It is furthermore proposed for the tubular sleeve to enclose the resilient support element with a form fit. It is conceivable for the tubular sleeve to enclose the resilient support element with a form fit at least in sections. In this way, an, in particular, nonreleasable connection of the tubular sleeve to the resilient support element may be produced.

Advantageously, the tubular sleeve is in one piece. It is also conceivable for the tubular sleeve to be in several pieces.

For example, the tubular sleeve comprises a mounting mechanism for mounting the tubular sleeve on the rest of the ultrasonic measuring unit. The mounting mechanism for mounting the tubular sleeve on the rest of the ultrasonic measuring unit are advantageously threaded means, for example a screw thread. It is also conceivable for the mounting mechanism to be configured as a quick-release fastener system, for example, in the form of a bayonet fastener. It is also conceivable for the tubular sleeve to be connected nonreleasably, for example, adhesively bonded or soldered, to the rest of the ultrasonic measuring unit. For example, the tubular sleeve is connected on a connecting edge of the sleeve to the rest of the ultrasonic measuring unit. The connecting edge of the sleeve is advantageously opposite and separated from the outer edge of the sleeve. For example, the outer edge and the connecting edge of the sleeve respectively form an end side of the hollow-cylindrically configured sleeve.

For example, the measuring instrument comprises a fitting element for mounting the rest of the ultrasonic measuring unit, in particular, for mounting the tubular sleeve on the measuring instrument. For example, the rest of the ultrasonic measuring unit or the tubular sleeve comprises a fitting member for mounting the rest of the ultrasonic measuring unit on the measuring instrument. For example, the fitting member is a part of the mounting mechanism of the tubular sleeve. Advantageously, the fitting member and the fitting element are matched to one another. The fitting member and the fitting element are advantageously threaded means, for example a screw thread. It is also conceivable for the fitting member and the fitting element to be configured as a quick-release fastener system, for example, in the form of a bayonet fastener. For example, a housing of the rest of the ultrasonic measuring unit is formed from metal, for example, from stainless steel.

Preferably, the tubular sleeve and the resilient support element are adhesively bonded to one another. For example, the tubular sleeve and the resilient support element are connected to one another, in particular, nonreleasably. Preferably, the resilient support element is connected nonreleasably, for example, adhesively bonded, to the rest of the ultrasonic measuring unit.

It has likewise been found advantageous for the resilient support element to be present and configured in such a way that it is configured to be deformable and/or displaceable into the interior by an external pressure in the direction of an interior of the tubular sleeve, so that the outer edge of the tubular sleeve and an outer end of the support element can be brought into a flush state. In this way, a deformation of the resilient support element and, therefore, an, in particular, maximum force on the resilient support element are predeterminable.

The resilient support element extends, for example, in the interior of the tubular sleeve. For example, the resilient support element is configured cylindrically. For example, the resilient support element is a cylinder, in particular, a circular cylinder.

It is furthermore advantageous for an intermediate space to be present in a region of the outer edge of the tubular sleeve between the tubular sleeve and the resilient support element. The intermediate space is configured, for example, in the form of a hollow cylinder. For example, the tubular sleeve and the resilient support element are separated from one another by means of a wall thickness of the hollow cylinder in the region of the outer edge of the tubular sleeve. For example, the tubular sleeve and the resilient support element enclose the intermediate space, in particular, the intermediate space in the form of a hollow cylinder, on at least two sides, in particular, on three sides. Advantageously, the resilient support element is deformable into the interior of the tubular sleeve by an external pressure in the direction of the interior of the tubular sleeve. For example, the resilient support element is configured to be deformable, compressible and/or displaceable in the direction of the intermediate space into the interior of the tubular sleeve, in particular, into the intermediate space, by an external pressure in the direction of the interior of the tubular sleeve. In this way, the outer edge of the tubular sleeve and an outer end of the resilient support element can be brought into a flush state.

Advantageously, the resilient support element, in particular, the subregion of the resilient support element protruding beyond the outer edge of the tubular sleeve, is deformable or displaceable, in particular, fully into the intermediate space by the external pressure. Preferably, the resilient support element entirely fills the intermediate space in the deformed state. In this way, controlled resting or controlled bearing of the ultrasonic measuring unit on a surface to be measured is ensured. Advantageously, a maximum force which acts on the resilient support element during sampling of a surface to be measured is definable in this way. Advantageously, the external pressure is a sampling force which acts on the resilient support element during the sampling of the surface to be measured.

Preferably, the resilient support element is present on the tubular sleeve in such a way that the outer edge of the tubular sleeve comes to bear, in particular, immediately with the surface to be measured during a sampling process of a surface to be measured. For example, the edge of the tubular sleeve comprises a bearing face for bearing on a surface to be measured. Advantageously, the resilient support element is present on the tubular sleeve in such a way that the resilient support element is deformed by a sampling process on a surface to be measured, in such a way that the outer edge of the tubular sleeve comes to bear, in particular, immediately with the surface to be measured. For example, the resilient support element is present on the tubular sleeve in such a way that, by a sampling process on a surface to be measured, both the resilient support element and the outer edge of the tubular sleeve come to bear, in particular, immediately with the surface to be measured.

The resilient support element advantageously has a diameter of between 2 mm and 50 mm, between 4 mm and 30 mm or between 6 mm and 12 mm. In particular, the resilient support element has a diameter of for example 2 mm, 3 mm, 5 mm, 7 mm, 10 mm, 14 mm, 15 mm, 16 mm, 20 mm, 25 mm, 35 mm, 40 mm, 45 mm or in particular 8 mm. The resilient support element is, for example, between 2 mm and 40 mm long. For example, the support element is 2 mm, 3 mm, 4 mm, 5 mm, 6 mm, 7 mm, 8 mm, 9 mm, 10 mm, 11 mm or 12 mm long.

Advantageously, the resilient support element is configured to be longer than a length of the ultrasound stand-off of the resilient support element during an ultrasound measurement. Preferably, the resilient support element is in a deformed state, for example, in a compressed state, during an ultrasound measurement. The deformed state or the compressed state is advantageously an intermediate state of the resilient support element. For example, the resilient support element is configured to deform back again from the intermediate state into the basic state.

The ultrasound stand-off advantageously extends from the outer edge of the tubular sleeve, in particular, from the bearing face of the outer edge, to a contact face of an ultrasound generating element. Advantageously, the length of an ultrasound stand-off of the resilient support element is between 2 mm and 40 mm. For example, the ultrasound stand-off is 11.7 mm. Advantageously, a length of the ultrasound stand-off, and, therefore, also a length of the resilient support element, are dependent on a layer thickness or material thickness to be measured.

In a basic state of the resilient support element, an outer end side of the resilient support element is separated from the outer edge of the tubular sleeve, in particular, from the bearing face of the tubular sleeve, in a range of from more than 0 mm to 5 mm. Advantageously, the outer end side of the resilient support element is separated from the outer edge in the basic state in a range of from more than 0 mm to 3 mm or more than 0 mm to 1.5 mm. For example, the end side of the resilient support element is separated from the outer edge by 0.05 mm, 0.1 mm, 0.2 mm, 0.3 mm, 0.4 mm, 0.5 mm, 0.6 mm, 0.7 mm, 0.8 mm, 0.9 mm, in particular 1 mm. A separation of the outer end side of the resilient support element from the outer edge of the tubular sleeve, in particular, from the bearing face of the outer edge of the tubular sleeve, is to be regarded, in particular, in the longitudinal extent of the tubular sleeve. For example, the separation is to be regarded in the direction of a symmetry axis of the resilient support element and/or of the tubular sleeve. It is, however, also conceivable for the distance to be 0 mm and for the outer end side of the resilient support element to be, in particular, at least approximately flush with the outer edge of the tubular sleeve, for example, with the bearing face of the outer edge.

The basic state of the resilient support element is advantageously the state in which the outer end side of the resilient support element is not being acted upon, in particular, not by an external force. Preferably, the outer end side of the resilient support element is an end-side face by means of which a surface to be measured may be contacted by the resilient support element. The outer end side of the resilient support element is, for example, in the form of a circular disk. Advantageously the outer end side of the resilient support element forms a cylinder end side of the resilient support element configured as a cylinder.

It has also been found advantageous for the ultrasonic measuring unit to be configured to be arrangeable interchangeably or replaceably on the measuring instrument. In this way, the measuring instrument is, for example, adaptable to a layer thickness or material thickness to be measured. For example, there are various ultrasonic measuring units which differ, in particular, only by a length of the ultrasound stand-off, a length of the retardation path or a length of the delay line. Advantageously, the various ultrasonic measuring units differ, in particular, by the length of the resilient support element.

It is furthermore proposed for an ultrasound generating element of the ultrasonic measuring unit to be formed in the interior of the tubular sleeve. For example, the ultrasound generating element is present in a region around the connecting edge of the tubular sleeve. Preferably, the ultrasonic measuring unit comprises an ultrasound generating element. Advantageously, the ultrasound generating element comprises a piezo element. Preferably, the ultrasound generating element generates sound waves in the ultrasound range. The sound waves are advantageously longitudinal waves in the ultrasound frequency range.

It is also advantageous for an ultrasound detection element of the ultrasonic measuring unit to be formed in the interior of the tubular sleeve.

Advantageously, the ultrasound generating element is a transceiver. For example, the transceiver is configured both to emit or generate sound waves and to receive or detect sound waves. A sound generation frequency of the ultrasound generating element is advantageously in a range around 500 Hz. For example, the sound generation frequency of the ultrasound generating element is 500 Hz. For example, the ultrasound detection element and the ultrasound generating element are integral.

Preferably, the ultrasound generating element and/or the ultrasound detection element are connected immediately to the resilient support element. For example, the ultrasound generating element and/or the ultrasound detection element are adhesively bonded to the resilient support element. Advantageously, the ultrasound generating element and/or the ultrasound detection element are present on an inner end side of the resilient support element which is opposite and separated from the outer end side of the resilient support element. Advantageously, the inner end side of the resilient support element is arranged flush, in particular, at least approximately flush, with the connecting edge of the tubular sleeve. For example, the resilient support element is connected, in particular, nonreleasably, for example, adhesively bonded, to the rest of the ultrasonic measuring unit by means of the ultrasound generating element.

Preferably, the ultrasound generating element and/or the ultrasound detection element are configured in the form of a disk, for example, as a circular disk. Preferably a dimension of the resilient support element is matched to a dimension of the ultrasound generating element and/or of the ultrasound detection element.

Advantageously, a diameter of the resilient support element corresponds to from 1 times to 3 times the diameter of the disk-like ultrasound generating element and/or of the disk-like ultrasound detection element. For example, the ratio of the diameter of the resilient support element to the diameter of the disk-like ultrasound generating element and/or of the disk-like ultrasound detection element is from 1:1 to 3:1.

It has also been found advantageous for the ultrasonic measuring unit to have a contacting member for the electrical contacting of a contacting element of the measuring instrument. For example, the contacting member and the contacting element are complementary. For example, the contacting member and the contacting element are configured as a plug connector. The plug connector is, for example, a Lemo plug connector. Advantageously, the contacting member is electrically conductively connected to the ultrasound generating element and/or the ultrasound detection element. In this way, on the one hand the ultrasonic measuring unit is configured interchangeably and on the other hand in this way the ultrasound generating element and/or the ultrasound detection element are connectable to a control unit of the measuring instrument.

Advantageously, a control unit for controlling the ultrasonic measuring unit is formed on the measuring instrument. Advantageously, the control unit is configured to drive and regulate the ultrasound generating element and/or the ultrasound detection element. For example, the control unit comprises a calculation intelligence in order to determine a material thickness or a layer thickness of a measurement object on the basis of the generated and received ultrasound signals.

One advantageous embodiment of the present invention is a measuring instrument having an ultrasonic measuring unit according to one of the variants mentioned above, wherein the measuring instrument has an, in particular, tactile sensor unit, a sampling event between the measuring instrument, in particular, the ultrasonic measuring unit, and a surface to be measured being detectable by means of the sensor unit. In this way, it is possible to determine a sampling state of the measuring instrument in which an ultrasound measurement may be carried out with the ultrasonic measuring unit.

For example, the sensor unit comprises an optically, capacitively and/or inductively operating sensor, for example, a switching sensor. For example, the sensor unit comprises a path sensor and/or force sensor. Advantageously, the sensor unit is configured as a switch or as a sampler. It is conceivable for the sensor unit to detect or ascertain a separation between a reference face of the measuring instrument and a surface to be measured and to emit a trigger signal after a defined separation value is fallen below, and, therefore, to detect the sampling event.

It is furthermore advantageous for the measuring instrument to be configured in such a way that an, in particular, single relative movement of the ultrasonic measuring unit relative to the measuring instrument triggers the sampling event.

Advantageously, the ultrasonic measuring unit, in particular, the tubular sleeve, is arranged in a manner mounted movably on the measuring instrument. In particular, the tubular sleeve is linearly movable. Advantageously, the measuring instrument comprises a restoring element, for example, in the form of a spring. For example, the ultrasonic measuring unit is mounted movably on the measuring device by way of the restoring element. Advantageously, the measuring instrument is configured in such a way that an, in particular, single relative movement of the tubular sleeve relative to the measuring instrument triggers the sampling event. Advantageously, the measuring instrument is present such that, during a sampling process of a surface to be measured, the resilient support element initially comes into, in particular, immediate contact with the surface to be measured, and is deformed by the sampling process because of the counter-pressure of the surface to be measured, so that during the further course of the sampling process the outer edge of the tubular sleeve comes into, in particular, immediate contact with the surface to be measured and during the further course of the sampling process the tubular sleeve is moved together with the resilient support element in the direction of the measuring instrument against a force of the restoring element, relative to the measuring instrument. For example, the measuring instrument is configured in such a way that a switching or sampling signal can be triggered by the sensor unit by the relative movement of the tubular sleeve in the direction of the measuring instrument.

It is furthermore advantageous for the sensor unit to have a photoelectric barrier. Advantageously, the photoelectric barrier comprises a light generating member and a light detection member and an electronic control module. The light generating member is, for example, configured as a diode. The light detection measure is, for example, configured as a photodiode. For example, a switching element of the measuring instrument is moved in the direction of the photoelectric barrier by the sampling process and the relative movement of the tubular sleeve in the direction of the measuring instrument, so that a trigger signal which signals a sampling event is triggered.

In one advantageous embodiment, the measuring instrument is configured to start an ultrasound measurement of the ultrasonic measuring unit because of the detection of a sampling event. Advantageously, the measuring instrument generates a trigger signal because of the detection of a sampling event. For example, the measuring instrument is configured to forward the trigger signal to the machine on which the measuring instrument may be arranged, so that an axle movement of the machine and therefore a movement of the measuring instrument can be stopped.

For example, the measuring instrument is configured to start an ultrasound measurement of the ultrasonic measuring unit chronologically after a sampling event, for example, at a predetermined time interval. In this way it is possible to carry out the determination of a material width or material thickness as a function of a position determination of the measuring instrument, so that the material width can be linked with a measurement position on the object to be measured.

Advantageously, with the ultrasonic measuring unit arranged on the measuring instrument an ultrasound measurement of an object to be measured may be carried out precisely when the ultrasonic measuring unit contacts, in particular, immediately, the object to be measured.

One advantageous embodiment of the present invention is a measuring device comprising a measuring instrument according to one of the embodiments mentioned above and comprising a transmission and reception unit for controlling the measuring instrument, the measuring instrument being configured to be arrangeable on a machine.

The transmission and reception unit is, for example, a receiver. For example, the transmission and reception unit and the measuring instrument communicate via a wireless communication channel. For example, the transmission and reception unit and the measuring instrument communicate by means of optical signals and/or by means of radio signals. The optical signals are, for example, infrared signals. The radio signals are, for example, Bluetooth signals. It is furthermore proposed for the transmission and reception unit and the measuring instrument to communicate with one another by means of a radio link. Preferably, the transmission and reception unit and the measuring instrument communicate by means of a WLAN interface, a Bluetooth interface and/or a mobile telephony interface. The mobile telephony interface is, for example, an LTE interface.

In one preferred embodiment of the measuring device, the measuring instrument has an interface in order to connect the measuring instrument to the machine, in particular, the machine tool and/or the measuring machine, the measuring instrument being configured to transmit an ultrasound measurement value to a command unit of the machine, in particular, to a command unit of the machine tool and/or to a command unit of the measuring machine, in particular, by means of the interface.

Advantageously, the transmission and reception unit is configured to be connectable to the machine. For example, the transmission and reception unit comprises an interface.

The interface is advantageously configured as a serial interface. Advantageously, the communication between the transmission and reception unit and the machine tool and/or the measuring machine is based on a synchronous serial protocol. It is also conceivable for the interface to be configured as a standard interface, for example, as a standard data bus. For example, the interface is a Profinet interface, an EnDat interface or an SPI (Serial Peripheral Interface). It has also been found advantageous for the interface to be a wired interface. In this way, a relatively secure transmission path is produced. It has likewise been found advantageous for the interface to have a signal line for an electricity supply of the command unit and a signal line for measurement signal transmission.

It is furthermore advantageous for the interface to have a signal line for serial data communication with the machine tool and/or the measuring machine. The interface is configured, for example, as a serial and/or parallel interface. Advantageously, the interface is in the form of a USB interface.

A further advantageous configuration of the present invention is a machine, in particular, a machine tool or a measuring machine, having a measuring instrument according to one of the embodiments mentioned above and/or a measuring device according to one of the embodiments mentioned above.

BRIEF DESCRIPTION OF THE DRAWINGS

Exemplary embodiments will be explained in more detail with the aid of the appended schematic drawings while specifying further details and advantages.

DETAILED DESCRIPTION OF THE INVENTION

Figure 1:
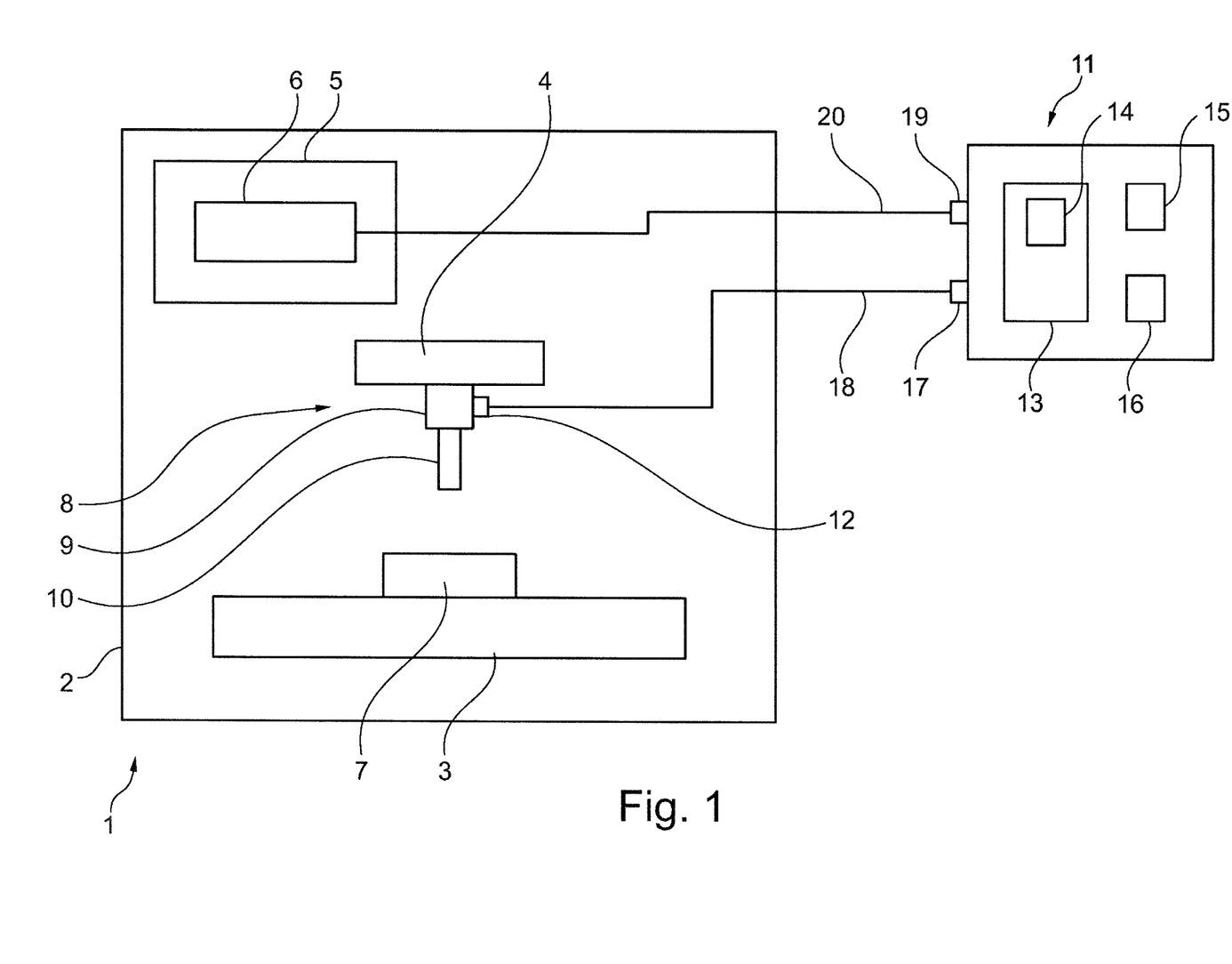
FIG. 1 shows a schematic representation of a machine having a measuring device.

FIG. 1 shows a machine 1 having a schematically represented casing 2, a machine table 3, a movement axle 4 and a command unit 5. The machine 1 comprises, for example, a memory module 6, which is present, for example, on the command unit 5. A measurement object 7 is arranged by way of example on the machine table 3.

A measuring device 8 is advantageously arranged on the machine 1. The measuring device 8 comprises a measuring instrument 9 and an ultrasonic measuring unit 10. The measuring device 8 may furthermore have a transmission and reception unit 11. The transmission and reception unit 11 has, for example, a control unit 13 with a command module 14. The measuring system 8 may furthermore comprise a memory unit 15 and a clock 16. In the embodiment variant according to FIG. 1, the measuring instrument 8 is coupled by way of example via the interfaces 12, 17 by means of a signal line 18 to the transmission and reception unit 11. The signal line 18 is, for example, a wireless signal line. The signal line 18 is, for example, configured as a radio link or a radio channel. It is also conceivable for the signal line 18 to be configured as an optical link, for example, as an optical line channel. Furthermore, the transmission and reception unit 11 is connected by means of the interface 19 to the machine 1, in particular, to the command unit 5 of the machine 1, via a further signal line 20. It is furthermore conceivable for the interface 19 to be configured as a standard interface, for example, as a USB interface or network interface.

Figure 2:
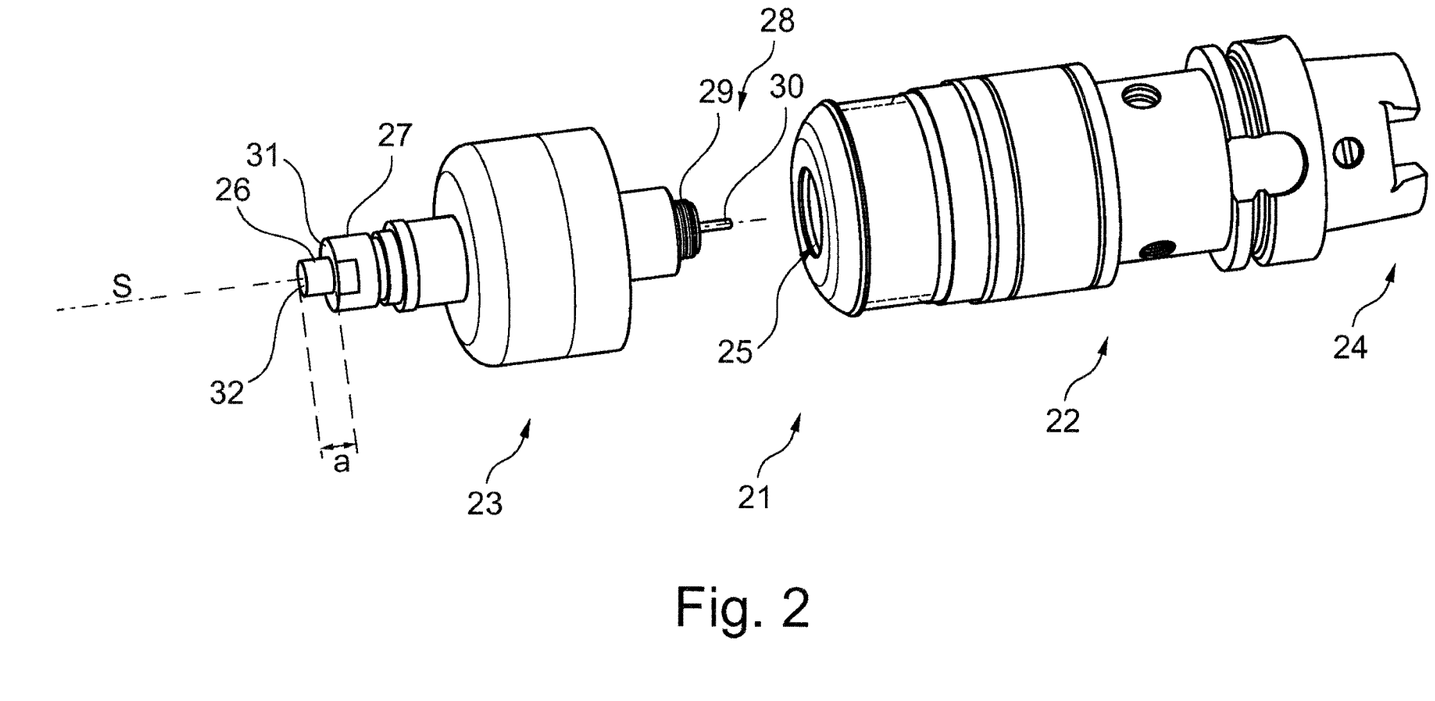
FIG. 2 shows a schematic representation in a further configuration variant of a measuring device.

FIG. 2 shows a further variant of a measuring device 21. The measuring device 21 comprises a measuring instrument 22 and an ultrasonic measuring unit 23. The measuring instrument 22 advantageously comprises a fitting mechanism 24 in order to connect the measuring instrument 22 to a movement axle of a machine (not shown), in particular, a tool holder of the machine. Furthermore present on the measuring instrument 22, there is a fitting element 25, which is configured by way of example as a female thread, for arranging the ultrasonic measuring unit 23.

The ultrasonic measuring unit 23 comprises a resilient support element 26 and a tubular sleeve 27. A fitting member 29 is formed on a first end 28 of the tubular sleeve 27 in order to connect the ultrasonic measuring unit 23 to the measuring instrument 22. The fitting member 29 is configured, for example, as a male thread in order to arrange the ultrasonic measuring unit 23 on the measuring instrument 22. Advantageously, an electrical contact 30 is furthermore formed on the first end 28 in order to connect the ultrasonic measuring unit 23 electrically conductively to the measuring instrument 22.

The resilient support element 26 advantageously protrudes beyond an outer edge 31 of the tubular sleeve 27. Advantageously, an outer end side 32 of the resilient support element 26 is separated at a separation a from the outer edge 31. The separation a is visible along a symmetry axis or rotation axis S of the resilient support element 26. In FIG. 2, the separation a of the outer end side 32 from the outer edge 31 is represented exaggeratedly in relation to the rest of the measuring device 21 for better comprehension.

The resilient support element 26 is advantageously configured cylindrically. In this way, it is relatively easy to produce.

Figure 3:
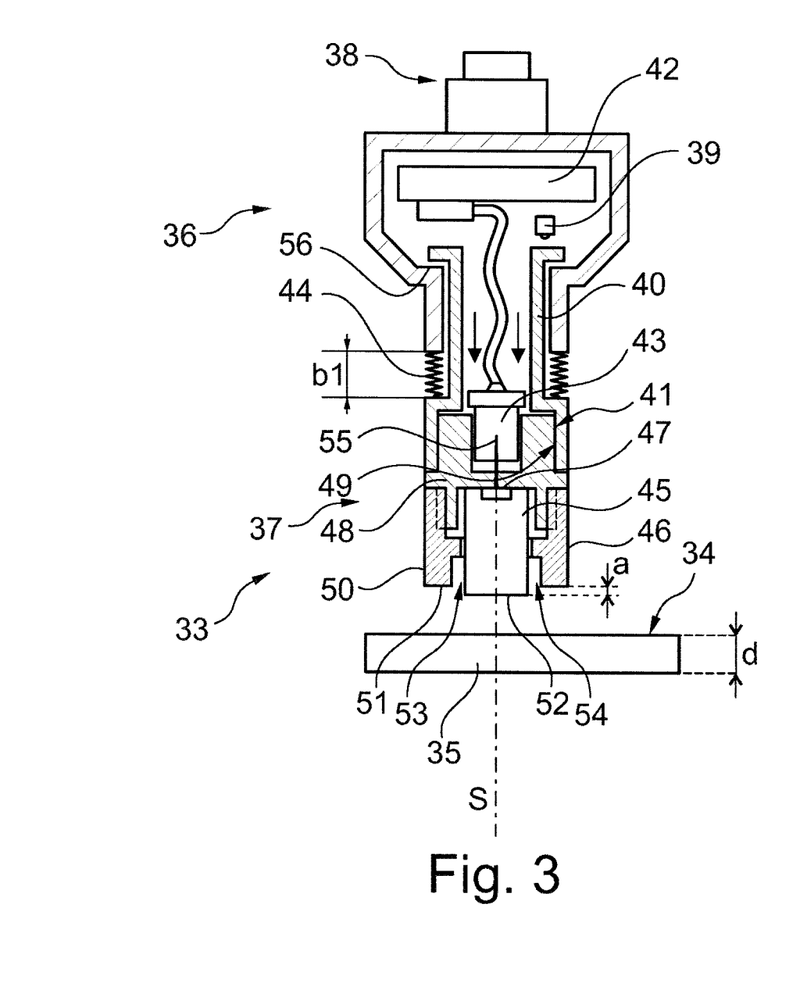
FIG. 3 shows a schematic cross-sectional representation of a further configuration variant of a measuring device in a basic state before sampling of a surface to be measured.
Figure 4:
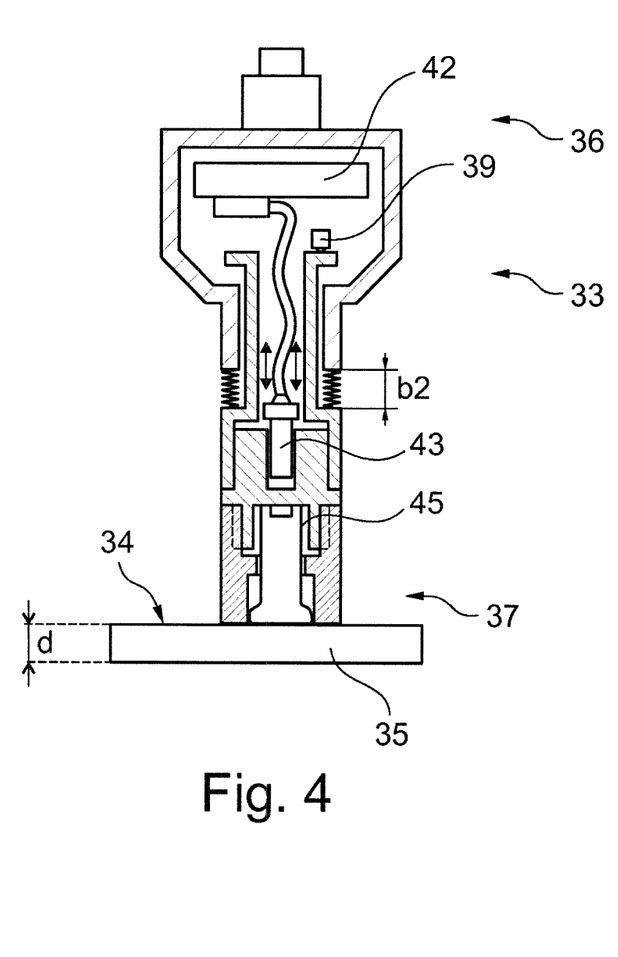
FIG. 4 shows a schematic cross-sectional representation of the measuring device according to FIG. 3 in an intermediate state during the sampling of the surface to be measured.

FIGS. 3 and 4 represent a further variant of a measuring device 33. In FIG. 3, the measuring device 33 is shown before sampling of a surface 34 of a measurement object 35, and in FIG. 4 the measuring device 33 is represented during sampling of the surface 34 of the measurement object 35.

The measuring device 33 comprises a measuring instrument 36 and an ultrasonic measuring unit 37.

The measuring instrument 36 comprises fitting mechanism 38 for mounting the measuring instrument 36 on a tool holder of a machine. The measuring instrument 36 furthermore comprises a sensor unit in the form of a switch 39, a switching element 40, a fitting element 41, a control unit 42, an electrical connection means in the form of a plug 43, as well as a restoring element in the form of a spring element 44.

The ultrasonic measuring unit 37 comprises a resilient support element 45, a tubular sleeve 46, an ultrasound generating element in the form of a piezo 47, as well as a housing 48 with a fitting member 49.

The sleeve 46 has an outer edge 50 with a sampling face 51. The resilient support element 45 has an end side 52, the end side 52 protruding by a separation a beyond the outer edge 50 of the sleeve 46 from an interior 53 of the sleeve 46.

An intermediate space 54 is advantageously present between the sleeve 46 and the resilient support element 45, so that the resilient support element 45 is deformable into the interior 53 of the sleeve 46, for example, into the intermediate space 54, during a sampling process (see FIG. 4).

In the arranged state of the ultrasonic measuring unit 37 on the measuring instrument 36, the ultrasonic measuring unit 37 is electrically conductively connected to the measuring instrument 36 by means of an electrical contact 55 via the plug 43. Advantageously, the resilient support element 45 and the piezo 47 are connected nonreleasably, for example, adhesively bonded, to the housing 48.

In the basic state of the measuring device 33, the spring element 44 is in a relaxed state and comprises a length b1. The ultrasonic measuring unit 37, in particular, the outer edge 50 and the end side 52, are separated maximally far away from a bearing face 56 of the measuring instrument 36 in the basic state of the measuring device 33.

In order to measure a layer thickness or material thickness d of the measurement object 35, the measuring device 33 is moved onto the surface 34 of the measurement object 35 so that the resilient support element 45 comes to bear with the end side 52 immediately with the surface 34 of the measurement object 35, and in this case is deformed by the sampling force into the interior 53 of the sleeve 46 (see FIG.

4). In this way, the outer edge 50 comes to bear with its sampling face 51 immediately on the surface 34 of the measurement object 35. Advantageously, in this state the end side 52 and the sampling face 51 are flush, depending on the surface condition of the measurement object 35. The separation a is in this state advantageously 0.

By a further movement of the measuring device 33 in the direction of the measurement object 35, the sleeve 46 and, therefore, the housing 48 and the resilient support element 45 are moved relative to the measuring instrument 36 in the direction of the measuring instrument 36. By this movement, the spring element 44 is tensioned and the switching element 40 is moved in the direction of the switch 39 until the switching element 40 interacts with the switch 39, for example, switches the latter, and a trigger signal is thereby triggered. In this state of the measuring device 33, the spring element 44 is in a stressed state and comprises a length b2 which is shorter than the length b1. The measuring instrument 36, in particular, the control unit 42, is advantageously furthermore configured to transmit the trigger signal to a machine on which the measuring device 33 is arranged, so that a movement of the measuring device 33 in the direction of the measurement object 35 is stopped and, for example, a sampling coordinate in relation to the measurement object 35 is ascertained by the measuring device 33. Furthermore, the measuring device 33 is configured to subsequently carry out an ultrasound measurement in order to determine the layer thickness or material thickness d of the measurement object 35. After the ultrasound measurement, the measuring device 33 is moved away from the measurement object 35 by the machine 1 and the spring element 44, as well as the resilient support element 45, relax back into the basic state according to FIG. 3.

LIST OF REFERENCES 1 machine
2 casing
3 machine table
4 movement axle
5 command unit
6 memory module
7 measurement object
8 measuring device
9 measuring instrument
10 ultrasonic measuring unit
11 transmission and reception unit
12 interface
13 control unit
14 command module
15 memory unit
16 clock
17 interface
18 signal line
19 interface
20 signal line
21 measuring device
22 measuring instrument
23 ultrasonic measuring unit
24 fitting mechanism
25 fitting element
26 support element
27 sleeve
28 end
29 fitting member
30 contact
31 edge
32 end side
33 measuring device
34 surface
35 measurement object
36 measuring instrument
37 ultrasonic measuring unit
38 fitting mechanism
39 switch
40 switching element
41 fitting element
42 control unit
43 plug
44 spring element
45 support element
46 sleeve
47 piezo
48 housing
49 fitting member
50 edge
51 sampling face
52 end side
53 interior
54 intermediate space
55 contact
56 bearing face

The invention claimed is:

1. A measuring instrument configured to be arranged on a movement axle of a machine, the measuring instrument comprising:
   a tactile sensor unit; and
   an ultrasonic measuring unit, wherein an ultrasonic measurement is carried out by the ultrasonic measuring unit arranged on the measuring instrument, and wherein the ultrasonic measuring unit comprises a tubular sleeve, and a resilient support element,
   wherein the tubular sleeve encloses the resilient support element,
   wherein the resilient support element comprises a columnar body that consists of a material that conducts ultrasound waves,
   wherein the resilient support element protrudes beyond an outer edge of the tubular sleeve at a first end of the tubular sleeve,
   wherein the tubular sleeve and the resilient support element both directly contact a surface of a sample to be measured during a sampling event of the measuring instrument,
   wherein the sampling event between the measuring instrument and the surface of a sample to be measured is detectable by means of the tactile sensor unit,
   wherein the tubular sleeve is movably mounted on the measuring instrument, and
   wherein a relative movement of the tubular sleeve toward the tactile sensor unit of the measuring instrument triggers the sampling event.

2. The measuring instrument as claimed in claim 1, wherein the measuring instrument generates a trigger signal upon detecting the sampling event, and
   wherein the measuring instrument forwards the trigger signal to the machine in the arranged state on the machine, so that an axle movement of the machine, and therefore a movement of the measuring instrument, can be stopped.

3. The measuring instrument as claimed in claim 1, wherein the tubular sleeve is formed from a plastic material.

4. The measuring instrument as claimed in claim 1, wherein the tubular sleeve encloses the resilient support element with a form fit.

5. The measuring instrument as claimed in claim 1, wherein the resilient support element is deformable and/or displaceable into an interior of the tubular sleeve by an external pressure in a direction of the interior of the tubular sleeve, so that the outer edge of the tubular sleeve and an outer end of the support element are brought into a flush state.

6. The measuring instrument as claimed in claim 1, wherein an intermediate space is present in a region of the outer edge of the tubular sleeve, between the tubular sleeve and the resilient support element.

7. The measuring instrument as claimed in claim 1, wherein the ultrasonic measuring unit is arrangeable interchangeably or replaceably on the measuring instrument.

8. The measuring instrument as claimed in claim 1, wherein an ultrasound generating element of the ultrasonic measuring unit is formed in an interior of the tubular sleeve.

9. The measuring instrument as claimed in claim 1, wherein an ultrasound detection element of the ultrasonic measuring unit is formed in an interior of the tubular sleeve.

10. The measuring instrument as claimed in claim 1, wherein the measuring instrument is configured in such that a relative movement of the ultrasonic measuring unit with respect to the measuring instrument also triggers the sampling event.

11. The measuring instrument as claimed in claim 1, wherein the measuring instrument is starts an ultrasound measurement of the ultrasonic measuring unit due to the detection of a sampling event.

12. The measuring instrument as claimed in claim 1, wherein the tactile sensor unit has a photoelectric barrier.

13. A measuring device comprising:
a measuring instrument as claimed in claim 1; and
a transmission and reception unit for controlling the measuring instrument,
wherein the measuring device is arrangeable on a measuring machine and/or on a machine tool.

14. The measuring device as claimed in claim 13, wherein the measuring instrument has an interface to connect the measuring instrument to the machine tool and/or the measuring machine, and
Wherein the measuring instrument transmits an ultrasound measurement value to a command unit of the machine tool and/or to a command unit of the measuring machine.

15. A machine tool or measuring machine having a measuring instrument as claimed in claim 1.

16. The measuring instrument as claimed in claim 10, wherein a single relative movement of the ultrasonic measuring unit with respect to the measuring instrument triggers the sampling event.

17. A machine tool or measuring machine having a measuring device as claimed in claim 13.

18. The measuring instrument as claimed in claim 1, wherein the ultrasonic measuring unit further comprises an ultrasound generating element, and
wherein the resilient support element is adhesively bonded to the ultrasound generating element.

19. The measuring instrument as claimed in claim 1, further comprising at least one spring by which the ultrasonic measuring unit is movably mounted on the measuring instrument.

* * * * *